United States Patent Office 2,774,409
Patented Dec. 18, 1956

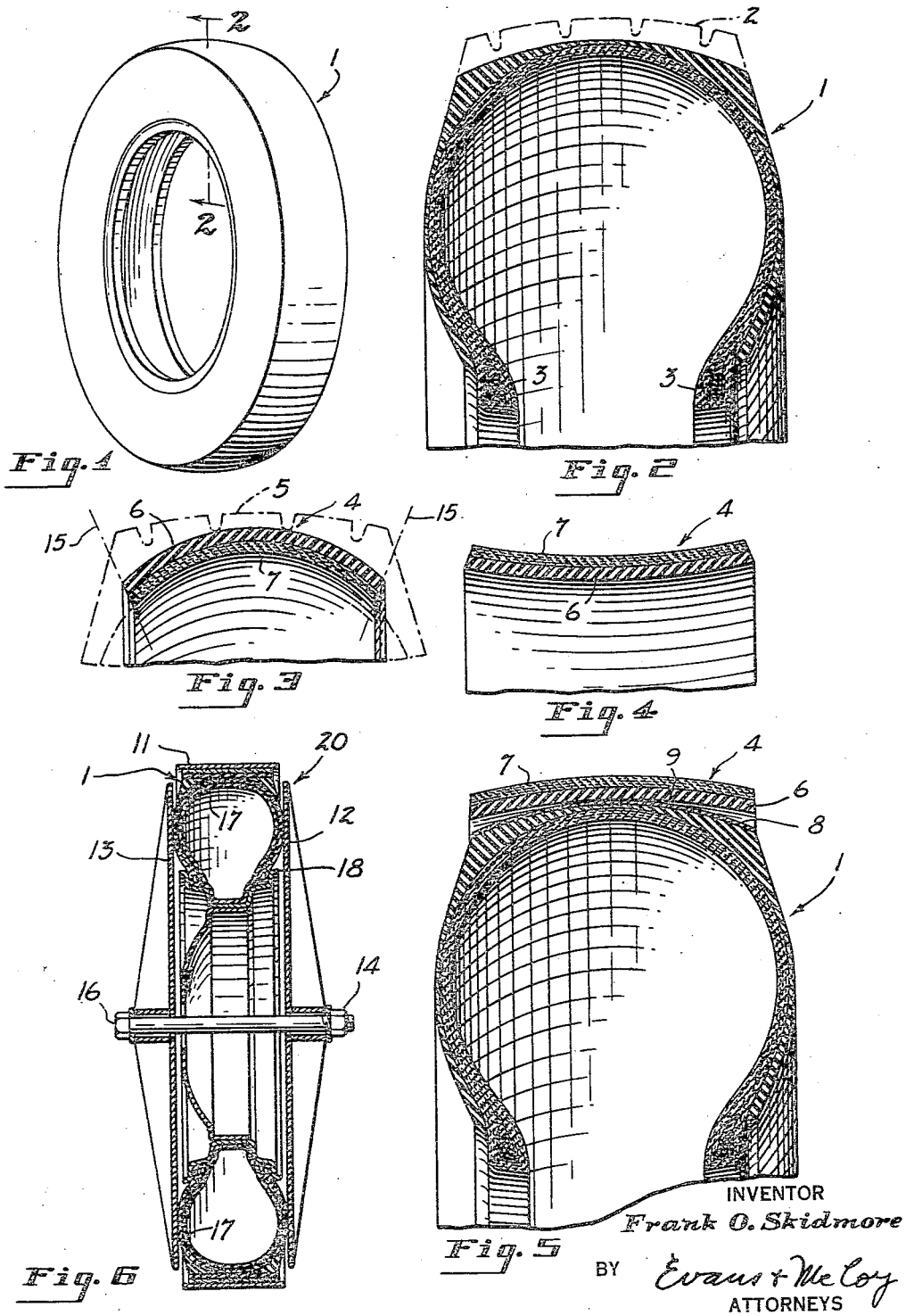

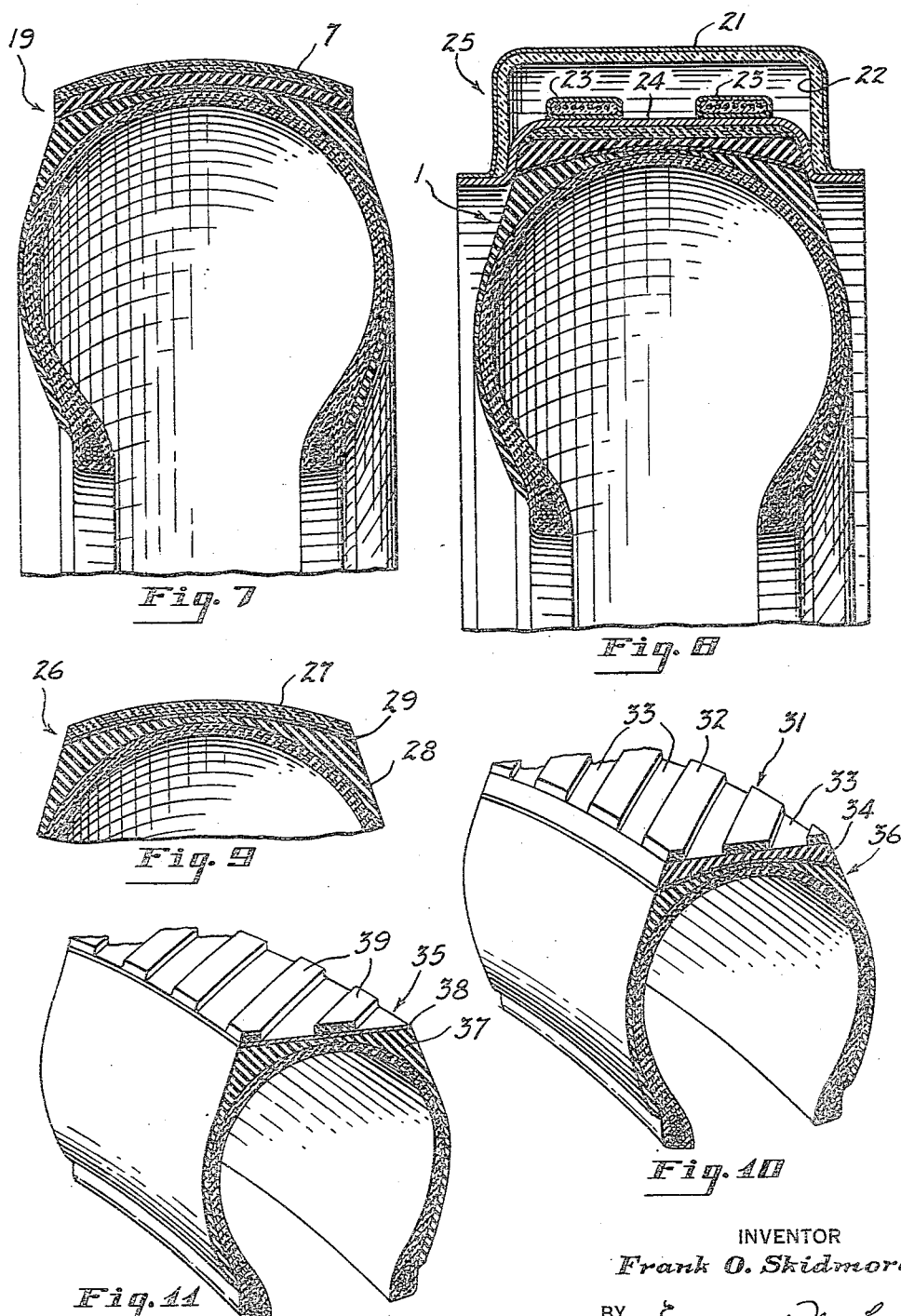

2,774,409

METHOD OF MAKING SKID-RESISTANT TIRE

Frank O. Skidmore, Cuyahoga Falls, Ohio, assignor to The General Tire & Rubber Company, Akron, Ohio, a corporation of Ohio Application December 31, 1952, Serial No. 328,847

7 Claims. (Cl. 154—14)

This invention relates to a pneumatic tire and to a process of manufacturing the same. In particular, it relates to a pneumatic tire provided with a fabric tread surface having unusual traction and skid-resistant characteristics.

One object of the subject invention is to provide a pneumatic tire which is both skid-resistant and long-wearing.

Another object of the subject invention is to provide a pneumatic tire which is skid-resistant and which is relatively simple and inexpensive to make.

Other objects and advantages will become apparent from examination of the drawings in which like numerals relate to like parts throughout. In the drawings:

Figure 1 is a perspective view of a pneumatic tire with the tread portions buffed smooth;

Fig. 2 is a sectional view taken along line 2—2 of Figure 1 showing the cross-sectional shape of a buffed tire and showing in phantom lines the worn-off and buffed-off tread portion;

Fig. 3 is a sectional view of the crown portion cut from a tire buffed-off to provide an even tread and fabric thickness and showing in phantom lines the worn-off and buffed-off tread portion;

Fig. 4 is a sectional view of the cut-out crown portion of Fig. 3 turned inside out;

Fig. 5 is a sectional view showing the inside-out crown portion of Fig. 4 assembled on the tread of a buffed tire;

Fig. 6 shows the assembly of Fig. 5 placed in a retread mold for vulcanization;

Fig. 7 is a cross-sectional view of a pneumatic tire of the subject invention with the cut-out crown portion vulcanized thereon;

Fig. 8 is a cross-sectional view showing a form of vulcanization apparatus provided with built-in heating elements;

Fig. 9 is a cross-sectional view of the crown portion of a modified form of a tire of the subject invention;

Fig. 10 is a perspective view of a section of a tire of the subject invention provided with tread configurations; and Fig. 11 is a perspective view of a section of another modified form of tire in accordance with the subject invention provided with cemented-on fabric tread portions.

The subject invention relates both to a process of retreading a pneumatic tire to make it skid-resistant and to a tire manufactured in accordance with this process. It involves the steps of buffing the tread off a tire, cutting out and removing the buffed-off, crown portion, turning the crown portion inside out and assembling it on a second buffed-off tire carcass. This forms a pneumatic tire with a fabric tread portion or road contacting portion. The fabric tread portion surprisingly has great traction and skid-resistance and is relatively long wearing.

A buffed-off tire 1 is shown in Fig. 1. The tire can be buffed-off and the tread removed in accordance with any of the recognized processes. This generally involves grinding and otherwise removing the worn tread portion from the tire until a clean, slightly roughened surface is presented. Old and scrap tires are generally utilized for this purpose because they are the least expensive. The tire casing should be carefully inspected, however, to make sure that it is unbroken and in good condition.

Fig. 2 shows a cross-sectional view of the buffed tire of Figure 1 with the tread portion 2, which has been removed by wear and buffing, being shown in phantom outline. Since a used tire is generally employed and is less expensive, much of the tread portion will have been worn off in service and it will only be necessary to buff off a small portion of the tread in order to provide a clean buffed surface. The tire 1 is preferably buffed to a slightly rounded section as shown in Fig. 2.

In order to obtain the crown portion of fabric cap 4 of Figs. 3 and 4, a tire is buffed to substantially even thickness and cut along lines 15 around the periphery on both sides. The buffed-off tread portion 5 is shown in phantom outline. The tire used for this purpose may even be one which is a scrap tire and is unfit for retreading, such as one with casing damage. The cuts 15 can be located at various points along the crown portion of tire depending upon the width of the tire being retreaded and of fabric tread desired. Thus if a small passenger tire is being retreaded a crown portion may be cut out of a large truck tire to have approximately the same width as that of the passenger tire.

The crown portion 4 cut out of the tire is shown in Figs. 3 and 4. It should be noted that in Fig. 3 the fabric 7 of the tire casing is inner most and the remaining tread rubber 6 is outer most. The crown portion or fabric tread ring 4 is in the form of an annulus or ring. In Fig. 4 the crown portion has been turned inside out or reversed to place the fabric 7 on the periphery and the remaining tread rubber 6 on the inside.

After the crown portion has been formed as noted above, the buffed surface of tire carcass 1 or the tire to be retreaded 1 is then covered with a thin layer of gum cement and an uncured cushion stock or gum stock 8 is placed around the tread periphery over the cement and against the tire crown. It is important that the tread be evenly buffed off to leave a clean surface and that the tire casing be in good condition. The ends of the stock are carefully matched up and all air bubbles removed. A layer of cement is then applied over the inside of crown portion 4 and the crown portion fit over the tire and against the uncured stock as shown in Fig. 5. In this latter operation it may be necessary to spread the tire beads apart in order to collapse the tire crown portion 9 and provide room for the cut-out crown portion or fabric cap 4. An assembly is thus formed with uncured gum stock 8 disposed between the fabric cap and tire carcass crown portion or tread portion and with cement disposed on both sides of the gum stock.

This assembly is then placed on a rim 18 in ring 11 and plates 12 and 13 fit on either side thereof and are bolted together with bolt 16 and nut 14. Air bag 17 is placed inside the tire and blown up to expand the tire and fabric cap against the ring 11. The plates are bolted together so as to subject the side walls of the tire to pressure and further force the tire crown 9 outward against ring 11. The tire assembly in this retread mold 20 is then placed in a furnace and subjected to heat until it has vulcanized. After suitable vulcanization, the mold is disassembled and the tire removed.

The completed tire 19 as taken from the mold is shown in Fig. 7. This tire has an outer layer of fabric 7 which acts as a tread. The fabric layer is relatively thick and is found to wear very well and to provide unusual skid-resistant characteristics.

Fig. 8 shows an alternative form of retread mold 25. This mold is provided with a U-shaped cover 21 and inner ring 24. Mounted on ring 24 are electrical heating elements 23. The inner surface of cover 21 is provided with insulation 22. This mold provides its own vulcanization heat and does not have to be put in a furnace.

Fig. 9 shows a modification of the subject invention in which the tread is completely buffed off the scrap tire and a fabric cap 27 thus formed is applied to the retread tire. This tire 26 thus comprises a fabric tread 27 and a crown portion 28 joined by gum stock layer 29.

Fig. 10 shows a tire 31 similar to the tire of Fig. 7 except that grooves 33 have been cut into the fabric cap portion 34 on carcass crown 36 to provide tread configurations or tread portions 32. The grooves are generally cut into and through the fabric layer so that only the top of the tread configurations 32 has fabric thereon. The grooves can be easily formed by cutting the tire fabric along the bias and ripping it out.

Fig. 11 shows still another modification of the subject invention in which layer of uncured rubber 38 is applied to the crown of a buffed tire and strips of fabric 39 are cemented to uncured rubber layer 38 to provide individual tread configurations. The effect of this tread is similar to that of Fig. 10.

The fabric caps shown have been made from tire casings and generally comprise three or more layers of fabric with the bias set at various angles to the adjacent layer. Tire casing fabric is readily available and inexpensive. Tire casings with cotton, nylon, and rayon fibers are substantially equivalent for this use. It is understood that other cloth fabric and mat of substantial thickness can also be employed in accordance with this invention.

Although several embodiments of the subject invention have been herein shown and described, it will be understood that in accordance with the provisions of the patent statutes, numerous modifications of the construction shown may be resorted to without departing from the spirit of this invention.

What I claim is:

1. A process of retreading a tire comprising the steps of buffing off the tread of a tire, cutting the buffed crown off at the shoulders to form a fabric portion, turning said fabric portion inside out, buffing off the tread of a second tire, assembling said inside-out fabric portion over the buffed crown of said second tire with uncured gum stock and cement disposed between the crown of said second tire and said fabric portion, and vulcanizing said gum stock to bond permanently said fabric portion to the assembled tire.

2. The method of claim 1 in which a tread is cut in the crown portion of the assembled tire.

3. A process of retreading a tire comprising the steps of buffing off the tread of said tire to form a buffed crown of substantially uniform width, buffing off the tread of a second tire and cutting the shoulders thereof to form a strip of substantially uniform thickness having a width substantially the same as that of said buffed crown and a length several times said width, assembling the cut strip over said buffed crown with a vulcanizable adhesive compound disposed between said crown and said strip and with the fabric side of the strip providing a road-engaging surface, placing the assembled tire in a retread mold, and vulcanizing the adhesive compound in said mold.

4. A process of retreading a tire comprising the steps of buffing off the tread of said tire to form a buffed crown of substantially uniform width, buffing off the tread of a second tire and cutting the tire to form a multiple-ply strip of substantially uniform thickness having one side thereof formed by a ply of tire cord fabric, applying a thin layer of uncured gum stock and cement around the circumference of said buffed crown, assembling said strip over the gum stock with said one side out of contact with said gum stock, and placing the assembled tire in a retread mold so that the fabric ply of said one side engages the peripheral inner surface of said mold, and subjecting the assembly to heat and pressure until the gum stock is vulcanized and said strip is permanently bonded to said crown.

5. A process of retreading a tire comprising the steps of buffing off the tread of said tire to form a buffed crown of substantially uniform width, buffing off the tread of a second tire until the layer of tread rubber covering the tire cord fabric is of substantially uniform thickness, cutting off the side walls of said second tire to form a strip having a substantially uniform width equal to that of said buffed crown and of a size to completely cover said crown, turning said strip inside out, assembling the inside-out strip over said buffed crown with uncured gum stock disposed between said crown and said strip, the tread rubber portion of said strip facing said crown and engaging said gum stock, and vulcanizing said gum stock to bond said tread rubber portion permanently to the tread rubber of said crown.

6. A process of retreading a tire as defined in claim 5 in which diagonal grooves are formed in the fabric cap portion of the assembled tire by cutting the tire fabric along the bias and ripping out the fabric between adjacent cuts.

7. A process of retreading a pneumatic fabric-reinforced rubber tire comprising the steps of buffing off the tread of said tire to form a buffed crown of substantially uniform width, removing a portion of the tread of a second worn pneumatic rubber tire and cutting the tire to form a multiple-ply strip of generally uniform thickness having one side face thereof formed by a ply of tire cord fabric and having a width not substantially different from that of said buffed crown, the cords of said ply having a bias at an angle to that of the next adjacent ply, applying a thin layer of a vulcanizable rubber adhesive compound around the circumference of said buffed crown, assembling said strip over the layer of said vulcanizable rubber compound with said one side face out of contact with said rubber compound, and placing the assembled tire in a retread mold so that the fabric ply of said one side engages the peripheral inner surface of said mold, and subjecting the assembly to heat and pressure until said rubber compound is vulcanized and said strip is permanently bonded to said crown.

References Cited in the file of this patent

UNITED STATES PATENTS

| Number | Name | Date |
|---|---|---|
| 588,562 | Farmer | Aug. 24, 1897 |
| 1,014,912 | Shoemaker | Jan. 16, 1912 |
| 1,171,449 | McGiehan | Feb. 15, 1916 |
| 1,509,301 | Kearns | Sept. 23, 1924 |
| 1,954,926 | Fraser | Apr. 17, 1934 |
| 2,059,982 | Budd | Nov. 3, 1936 |
| 2,180,650 | White | Nov. 21, 1939 |
| 2,232,488 | Smith | Feb. 18, 1941 |
| 2,290,624 | Waite | July 21, 1942 |
| 2,432,630 | Purdy | Dec. 16, 1947 |
| 2,605,199 | Hawkinson | July 29, 1952 |